Patented Aug. 5, 1924.

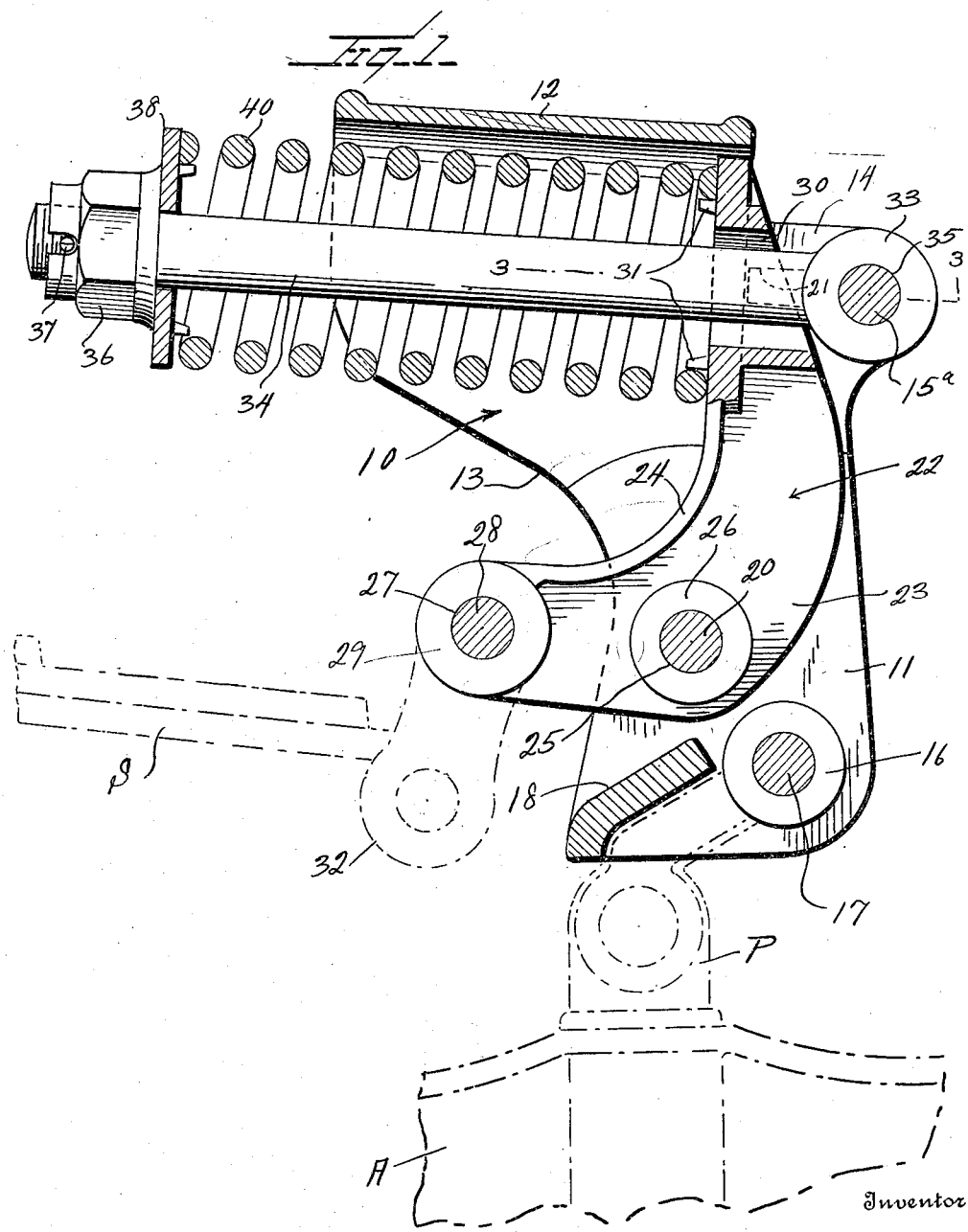

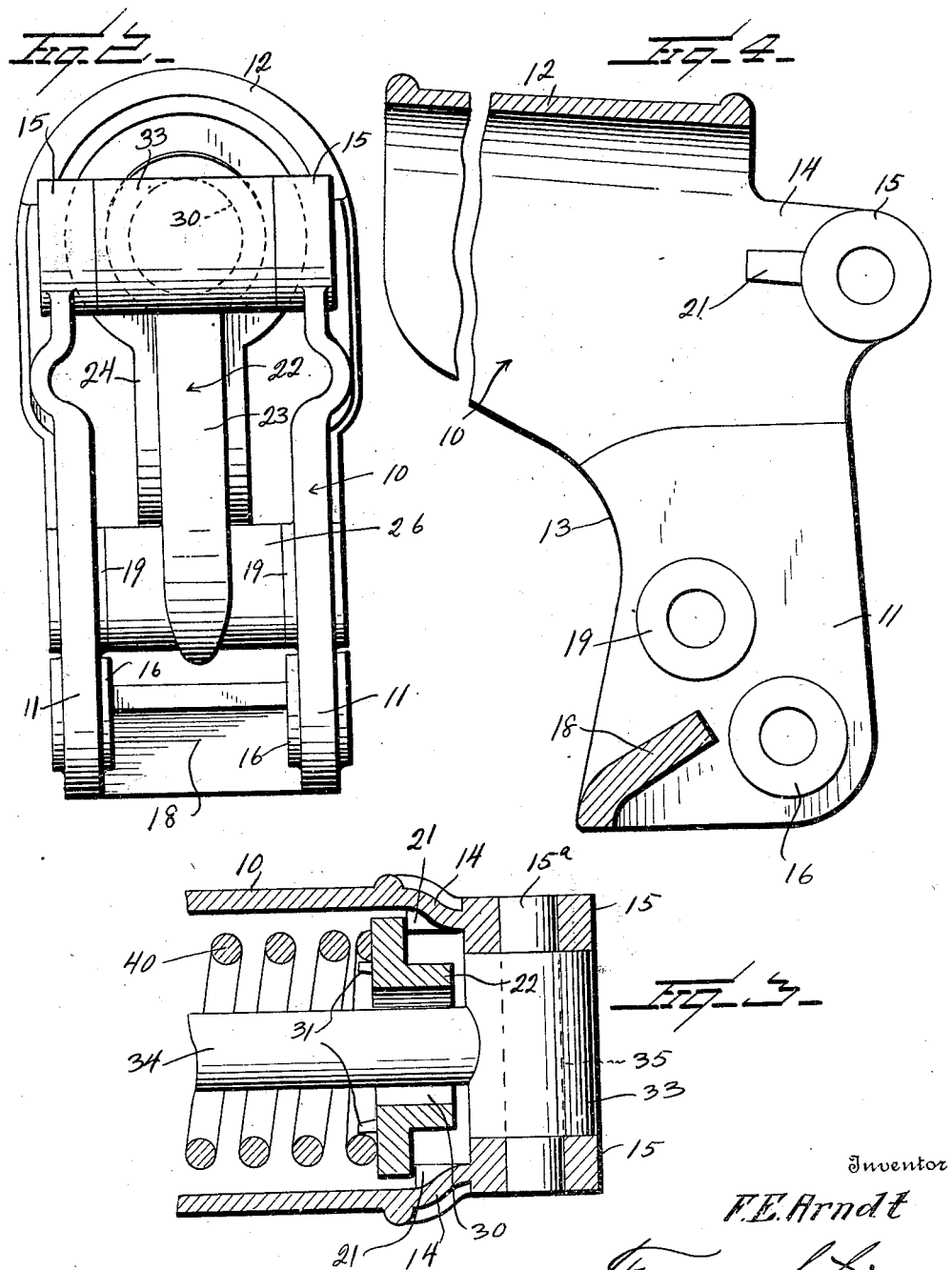

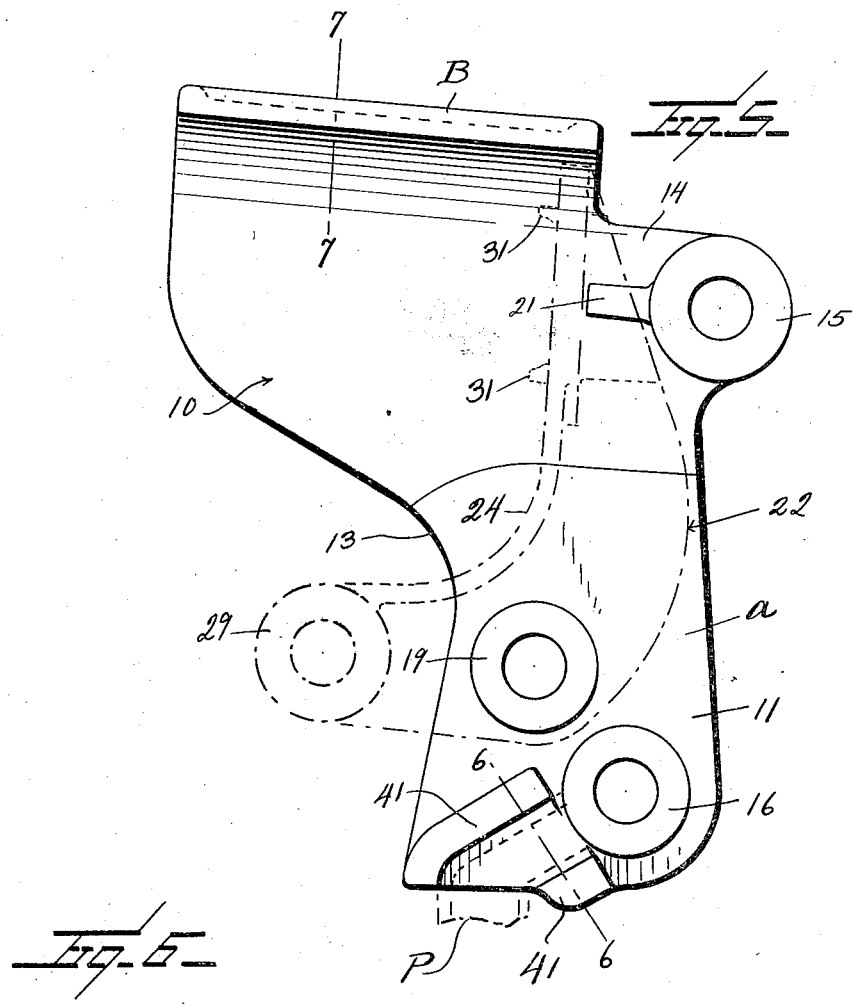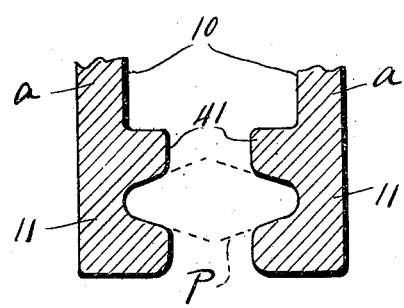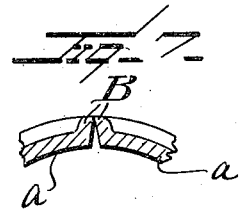

1,504,012

UNITED STATES PATENT OFFICE.

FRANKLIN E. ARNDT, OF GALION, OHIO.

SHOCK ABSORBER.

Application filed February 8, 1922. Serial No. 534,957.

*To all whom it may concern:*

Be it known that I, FRANKLIN E. ARNDT, a citizen of the United States, residing at Galion, in the county of Crawford and State of Ohio, have invented certain new and useful Improvements in Shock Absorbers, of which the following is a specification.

This invention relates to shock absorbers, and particularly to that class of shock absorbers which are mounted upon the perch of the vehicle as a support and have a movable element connected to the spring of the vehicle and whose movement is resisted in one direction by a compression spring.

One of the objects of this invention is to provide a shock absorber of this character particularly adapted to Ford cars, though not necessarily limited to this use, and which is adapted to check or absorb the undue vibrations of the springs, and which is so simply constructed and so easily assembled that it may be cheaply made and may be readily applied to cars without the necessity of changing or altering in any manner the construction or arrangement of the car.

A further object is to provide a device of this character in which the coiled shock absorbing spring is, to a large extent, housed and protected, and in this connection to provide a device of this character in which the spring is so supported that it is not liable to slip out of place.

A still further object is to provide a mechanism of this character which will yieldingly resist the outward flexing of the spring by the compression of the cushioning spring which will permit the freer upward movement of the outer end of the spring but yet check this upward movement.

Other objects will appear in the course of the following description.

My invention is illustrated in the accompanying drawings, wherein:—

Figure 1 is a vertical section through my shock absorber showing the spring and axle of the vehicle in dotted lines;

Figure 2 is a rear elevation of the shock absorber;

Figure 3 is a fragmentary horizontal section on the line 3—3 of Figure 1;

Figure 4 is a vertical sectional view through the member 10;

Figure 5 is an inside elevation of one-half of the member 10 as modified;

Figure 6 is a section on the line 6—6 of Figure 5;

Figure 7 is a fragmentary section on the line 7—7 of Figure 5;

Referring to these drawings, it will be seen that I have illustrated a portion of an axle A with the usual perch P thereon and the usual upwardly bowed spring S. My shock absorber comprises a main case or element, designated 10, which is approximately U-shaped to provide the two arms 11 and the transversely extending upper portion 12. These arms have their forward edges extended downward and then laterally as at 13, from the portion 12 and their rear edges extending outward to form ears 14 and then extended downward and slightly rearward. These ears 14 are provided with relatively thickened, cylindrical bearings 15 for a transverse pivot pin $15^a$. The lower ends of the arms 11 are formed with inwardly projecting journals 16 for a transverse bolt 17 which connects the case 10 to the upper end of the perch P, and the arms 10 are formed with inwardly projecting lugs 18 which extend upward and rearward at an angle and are adapted to rest upon the shank of the perch P, as shown clearly in Figure 1, and limit the movement of the case 10 upon the bolt 17 in one direction. Above and forward of the bearing 16 there is formed a bearing 19 for a transverse bolt or pin 20. On the inside face of the portions 14 of the arms 11 and extending from the bearing 15 are the oppositely disposed, rebound stop lugs 21.

Disposed between the arms 11 of the case 10 is an angular lever 22 having a web 23 disposed in a vertical plane and a curved strengthening flange 24 upon the forward edge of the web. At the intersection of the two arms of the angular lever there is formed the aperture 25 for the passage of the fulcrum pin 20, this aperture being surrounded by a circular flange 26. At the end of the short arm of the lever there is formed an aperture 27 for the passage of a shackle bolt 28, this aperture being surrounded by an annular flange 29. At its upper end the lever 22 is formed with a circular passage 30 and the face of the lever surrounding this passage is formed with a spring seat constituted by a plurality of outwardly projected lugs 31. This lever is pivoted to the case 10 by means of the pivot pin 20 and is connected by the bolt 28 to the usual shackle or link 32, which in turn is connected to the free end of the spring S in the usual manner.

Mounted between the flanges 15 is the cylindrical head 33 of a bolt 34. This cylindrical head has a longitudinally extending passage 35 through which the pivot pin 15ª passes. The other end of the bolt from the head 33 is screw-threaded for the reception of a nut 36 which is shown as a castellated nut held in place by a cotter pin 37. This nut bears against a relatively large washer 38. Surrounding the shank 34 of the bolt at one end against this washer or plate 38 and at the other end against the face of the lever 22 is a coiled compression spring 40. The inner end of this spring seats in the lugs 31, as previously stated. Normally the compression spring urges the upper end of the lever 25 back against the stop lugs 21 in the position shown in Figure 1. Upon a depression of the spring S, the short end of the lever 23 will be pushed downward, throwing the upper end of the lever 23 toward the nut 36 and thus compressing the spring 40. Of course, the depression of the forward end of the lever 23 would tend to urge the upper end of the case 10 toward the left in Figure 1, but this movement is prevented by the stop lug or lugs 18 engaging the perch. As the lever moves outward, the outer face of the lever moves away from the rebound stop lugs 21, but as soon as the action of the spring S has been checked the spring 40 acts to urge the upper end of the lever toward the inner wall of the case and again into contact with the stop lugs 21. The further upward movement of the outer end of the spring S will, therefore, tend to move the case 10 toward the right in Figure 1, but the friction of the parts tends to check the rebound movement of the spring S.

While the case 10 might be formed in one piece, as indicated in Figure 4, yet it is also possible to form the case in two parts and I have illustrated such a construction in Figure 5. In this view the case 10 is formed in the two sections a—a. These sections at their lower ends are formed with the upper and lower inwardly projecting lugs 41 which embrace the perch P, these lugs on the confronting faces being convergent, as illustrated in Figure 7, so as to close tightly upon the perch. The upper ends of the sections a—a are flanged and engage with each other, as at B in Figure 7. Of course, the stop lugs 41 are formed one on each section. The lever 22 is of the same construction and character as previously described and the mechanism operates in exactly the same way. Where the case is formed in two parts the sections a—a are held together by the fulcrum bolt 20 and by the bolt 17 which passes through the perch as well as by the fulcrum pin or bolt 15. In placing this two-part case upon the machine, the bolt 20 is loosened enough to allow the lugs 41 to slip around the spring perch. Then the clamp bolt 17 is put through the case and the fulcrum bolt 20 tightened up until the case is securely clamped in position. The bolt 15ª may be also loosened when the case is put in place and afterwards tightened up.

With this construction the spring is very largely protected and may be entirely protected by the hood or upper portion of the case 10. It will be obvious that the device is very readily put in place upon the car or as readily removed and is very effective for the purpose intended.

It will be seen that the parts 10 in Figures 1 and 5 constitute not only a housing for the spring 40 but also the main frame, affording a support for the different fulcrum points. The rebound check stops 21 limit the movement of the lever 22 under the action of the spring 40, particularly in the construction illustrated in Figure 5, where the perch is gripped between the two lugs 41. This causes the rebound or upward movement of the car to be caught and stopped a little more positively than it otherwise would be. It will furthermore be seen that with my construction the shock absorber is assembled in all respects before placing upon the car, which is not the case in other constructions known to me where the parts have to be assembled as they are placed upon the car. With my construction, furthermore, I am enabled to adjust the tension of the spring 40 from time to time to suit the weight of the car or the weight of the load to be carried. Thus if one is using his car for light work and not hauling a load, the springs 40 may be readily loosened or their tension decreased to allow more flexibility and if, on the other hand, a load is to be carried, the springs may have their tension increased, and it is obvious that the tension of the springs may be increased or decreased to suit the character of the car. Furthermore, with my construction there is no possibility of the spring jumping out of place. The spring is always held at right angles with the vibrating arm 22, which allows the spring to be compressed with an equal compression, thus avoiding any unequal loading of the spring.

I claim:—

1. A shock absorber of the character described comprising a member adapted to be mounted at its lower end upon the spring perch of a vehicle, a bolt oscillatably connected to the upper end of said member and carrying a stop at its outer end, a lever pivoted intermediate its length to said member and at its upper end having an aperture through which the bolts passes, a spring surrounding the bolt and bearing at one end against said stop and at its other end against the upper end of said lever, the lower end of the lever being adapted to be operatively connected to the free end of the spring, and stop lugs projecting inwardly from the sides of said member and engaged by the upper end of the lever for limiting movement thereof in one direction.

2. A shock absorber of the character described comprising a member adapted to be mounted at its lower end upon the perch of a vehicle, this member being formed to provide a transversely extending hood and laterally disposed, downwardly extending arms, a bolt oscillatably connected to the upper end of the member and extending between the arms thereof and having a stop at its outer end, an angular lever pivoted between the arms of said member and having an aperture at its upper end through which said bolt passes, a coiled compression spring surrounding the bolt and disposed between said stop and the upper end of the lever, the lower arm of the lever being adapted to be operatively connected to the end of the spring, and a lug within the member engaging against the shank of the perch and engageable by the lower edge of the lower arm of the lever for limiting downward movement thereof.

3. In a shock absorber, a supporting member including spaced sides connected at their upper ends by an arch constituting a species of hood, a lug within said support at the lower portion thereof adapted to be engaged upon the shank of a perch, the member having its sides formed with holes for the passage of a bolt connecting the support to the perch, a rod within the upper portion of said support, a spring surrounding said rod, an abutment on the rod for one end of the spring, an angular lever pivoted within the support and having a lower arm adapted for connection with a vehicle spring and its other arm slidable upon said rod and abutting against the other end of said spring, said lug being engageable by said lower arm of the lever for limiting downward movement thereof, and lugs within the upper portion of the support engaged by the upper end of the lever for limiting movement thereof in the other direction.

4. A shock absorber of the character described comprising a casing including downwardly extending spaced arms and an arched portion forming a species of hood, said casing being formed of two similar sections arranged in mating relation and disposable upon opposite sides of a vehicle spring perch, the arms being formed with registering holes for the passage of a bolt passing through the perch, a pair of spaced lugs on the inner face of each arm adapted to straddle the shank of the perch for holding the casing against movement with respect thereto, a lever pivoted within the casing and having one end adapted for connection with a vehicle spring, and spring means engaging the upper end of the lever for opposing movement thereof.

In testimony whereof I affix my signature.

FRANKLIN E. ARNDT.